(12) United States Patent
Yoshikawa et al.

(10) Patent No.: US 7,016,169 B2
(45) Date of Patent: Mar. 21, 2006

(54) MAGNETORESISTIVE HEAD WITH FIRST AND SECOND PAIRS OF ANTIFERROMAGNETIC FILMS IMPARTING MAGNETIC BIAS TO FIRST AND SECOND MAGNETIZATION FREE LAYERS AND PERPENDICULAR MAGNETIC RECORDING-REPRODUCING APPARATUS

(75) Inventors: Masatoshi Yoshikawa, Yokohama (JP); Masayuki Takagishi, Kawasaki (JP); Yuzo Kamiguchi, Yokohama (JP); Hiromi Yuasa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/968,958

(22) Filed: Oct. 21, 2004

(65) Prior Publication Data
US 2005/0083613 A1 Apr. 21, 2005

Related U.S. Application Data

(62) Division of application No. 10/059,153, filed on Jan. 31, 2002, now Pat. No. 6,847,509.

(30) Foreign Application Priority Data
Feb. 1, 2001 (JP) .............................. 2001-025734

(51) Int. Cl.
*G11B 5/39* (2006.01)
(52) U.S. Cl. ................................. 360/324.12
(58) Field of Classification Search ........... 360/324.12, 360/324.1, 324, 313, 110, 327.3, 327.31, 360/327.32
See application file for complete search history.

(56) References Cited

U.S. PATENT DOCUMENTS

| 5,549,978 A | 8/1996 | Iwasaki et al. ............. 428/692 |
| 6,275,362 B1 | 8/2001 | Pinarbasi ................ 360/324.12 |
| 6,643,103 B1 | 11/2003 | Trindade ..................... 360/314 |
| 6,870,715 B1 * | 3/2005 | Umetsu .................. 360/324.12 |
| 2002/0114111 A1 | 8/2002 | Zhu .......................... 360/324.1 |
| 2004/0075960 A1 * | 4/2004 | Li et al. ................. 360/324.12 |

FOREIGN PATENT DOCUMENTS

| JP | 6-267029 | 9/1994 |
| JP | 7-307013 | 11/1995 |

(Continued)

OTHER PUBLICATIONS

Japanese Office Action Dec. 7, 2004.

*Primary Examiner*—Julie Anne Watko
(74) *Attorney, Agent, or Firm*—Oblon, Spivak, McClelland, Maier & Neustadt, P.C.

(57) ABSTRACT

A magnetoresistive head has a magnetoresistive film including first and second magnetization free layers, an intermediate layer sandwiched between the first and second magnetization free layers, an underlayer and a protective layer, a first electrode, a second electrode, a pair of first antiferromagnetic films, and a pair of second antiferromagnetic films. The first electrode is connected with the underlayer and the second electrode is connected with the protective layer, the electrodes allowing a current to flow in a direction substantially perpendicular to the plane of the magnetoresistive film. The pair of first antiferromagnetic films imparts a magnetic bias to the first magnetization free layer in a predetermined direction, and the pair of second antiferromagnetic films imparts a magnetic bias to the second magnetization free layer in a predetermined direction.

5 Claims, 10 Drawing Sheets

FOREIGN PATENT DOCUMENTS

| | | |
|---|---|---|
| JP | 9-288807 | 11/1997 |
| JP | 11-213354 | 8/1999 |
| JP | 2002-503887 | 2/2002 |
| WO | WO 99/41792 | 8/1999 |

* cited by examiner

MAGNETORESISTIVE HEAD WITH FIRST AND SECOND PAIRS OF ANTIFERROMAGNETIC FILMS IMPARTING MAGNETIC BIAS TO FIRST AND SECOND MAGNETIZATION FREE LAYERS AND PERPENDICULAR MAGNETIC RECORDING-REPRODUCING APPARATUS

CROSS-REFERENCE TO RELATED APPLICATIONS

This application is a divisional of U.S. application Ser. No. 10/059,153, filed Jan. 31, 2002, now U.S. Pat. No. 6,847,509 and is based upon and claims the benefit of priority from the prior Japenese Patent Application No. 2001-025734, filed Feb. 1, 2001, the entire contents of each of which are incorporated herein by reference.

BACKGROUND OF THE INVENTION

1. Field of the Invention

The present invention relates to a magneto-resistive head and to a perpendicular magnetic recording-reproducing apparatus.

2. Description of the Related Art

In recent years, increase recording density is being rapidly promoted in a magnetic recording medium such as HDD. With increase in the recording density, a size of a record bit recorded in the recording medium is decreased, and intensity in signal magnetic flux is also lowered. Such being the situation, a conventional ring core type inductive magnetic head, which indirectly detects the medium magnetic flux via the ring core by utilizing an electromagnetic induction effect, has come to fail to ensure a sufficient sensitivity relative to lower signal magnetic flux. Under the circumstances, a magnetoresistive head (MR head), which directly senses the medium signal flux by utilizing a magnetoresistance effect, has come to be put to the practical use in recent years.

Nowadays, a spin-valve type MR (SV-MR) head, which has a stacked film of [magnetization pinned layer (pinned layer)/intermediate layer (spacer layer)/magnetization free layer (free layer)] and produces a giant magnetoresistance effect, constitutes the mainstream of the MR head. The SV-MR head produces a giant magnetoresistance effect not smaller than twice that produced by the conventional MR head.

The conventional SV-MR head is constructed such that an SV-MR film is formed between a pair of magnetic shields with a magnetic gap provided therebetween. Also, the conventional SV-MR head uses a so-called current-in-plane (CIP)-MR head in which a sense current supplied by a pair of electrodes is allowed to flow within the plane of the SV film.

Recently, proposed is a so-called current-perpendicular-to-plane (CPP)-MR head, in which a sense current is allowed to flow in a direction perpendicular to the plane of the SV film. The CPP current flow permits further improving a rate of magnetoresistance change (MR change rate), so that a high head output is expected.

On the other hand, in the longitudinal magnetic recording system, improvement in recording density is approaching to the upper limit because of thermal disturbance. As a result, a perpendicular magnetic recording system, which is durable against the thermal disturbance, attracts attentions, and proposed is a system in which the perpendicular recording medium is combined with the SV-MR head.

Figure 1A:
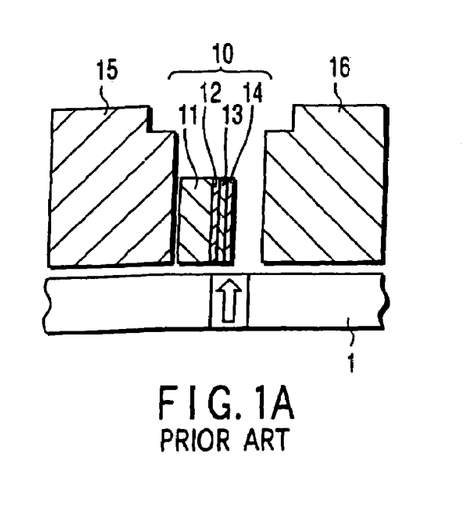
FIG. 1A is a cross sectional view schematically showing a construction of a conventional SV-MR head.
Figure 1B:
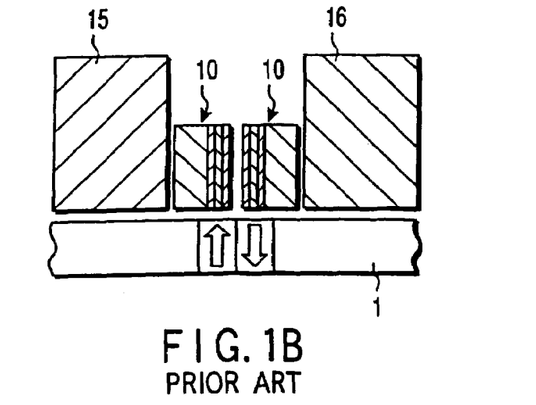
FIG. 1B is a cross sectional view schematically showing a construction of another conventional SV-MR head.
Figure 2A:
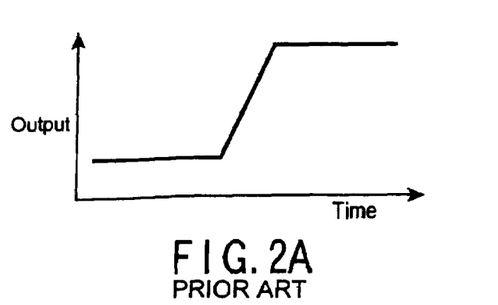
FIG. 2A is a graph showing an output waveform obtained from the SV-MR head shown in FIG. 1A.
Figure 2B:
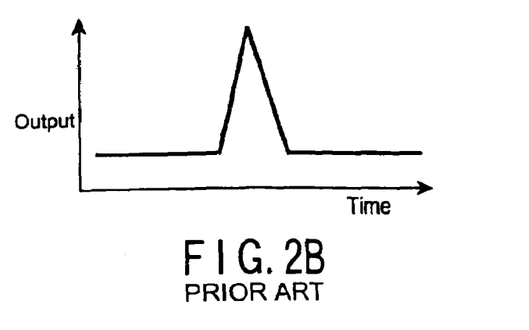
FIG. 2B is a graph showing an output waveform obtained from the SV-MR head shown in FIG. 1B.

FIGS. 1A and 1B show schematically constructions of CIP-mode SV-MR heads, which have already been proposed on assumption of use in combination with a perpendicular recording medium. FIGS. 2A and 2B show output waveforms obtained from the SV-MR heads shown in FIGS. 1A and 1B, respectively.

In the conventional systems shown in FIGS. 1A and 1B, what should be considered are an output waveform and reduction of the gap between a pair of magnetic shields. To be more specific, it is desirable that an output waveform having peaks corresponding to magnetization transitions should be obtained as in a conventional longitudinal magnetic recording system. Also, in order to cope with a high recording density expected in the future, it is desirable for the SV film arranged between the magnetic shields to have a small thickness so as to achieve a narrow gap.

FIG. 1A shows a perpendicular magnetic recording system to which a single SV-MR head is applied. As shown in the drawing, the single SV-MR film 10 is arranged to face the perpendicular recording layer 1. The SV-MR film 10 has a stacked structure of [antiferromagnetic layer 11/pinned layer 12/spacer layer 13/free layer 14] as the basic structure, and is arranged between a pair of magnetic shields 15 and 16.

In the system shown in FIG. 1A, obtained is an output waveform that is monotonously changed in accordance with a record bit. In this case, in order to obtain an output waveform having peaks corresponding to magnetization transitions as in the conventional longitudinal magnetic recording system, it is necessary to provide an additional differential circuit to a reproduced signal processing section. However, addition of the differential circuit tends to increase noise. The conventional SV-MR head is also defective in that, since the SV-MR head includes the thick antiferromagnetic layer 11, it is difficult to achieve a narrow gap for coping with high recording density expected in the future.

FIG. 1B shows a perpendicular magnetic recording system to which a dual striped SV-MR head is applied. As shown in the drawing, a pair of SV-MR films 10 are arranged to face the perpendicular recording layer 1. Each of the SV-MR films 10 is basically equal in construction to the SV-MR film 10 shown in FIG. 1A. The paired SV-MR films 10 are arranged between a pair of magnetic shields 15 and 16 in the system shown in FIG. 1B.

In the system shown in FIG. 1B, the two SV-MR films are differentially operated so as to obtain an output waveform similar to that obtained in the conventional longitudinal magnetic recording system, as shown in FIG. 2B. In the construction shown in FIG. 2B, however, the two SV-MR films are formed within the magnetic gap, which also leads to the problem that it is impossible to cope with high recording density expected in the future.

BRIEF SUMMARY OF THE INVENTION

An object of the present invention is to provide a magnetoresistive head capable of achieving a narrow gap so as to cope with a high recording density, and to provide a perpendicular magnetic recording-reproducing apparatus having the particular magnetoresistive head mounted thereto.

According to one aspect of the present invention, there is provided a magnetoresistive head, comprising: a magnetoresistive film including first and second magnetization free layers, an intermediate layer sandwiched between the first and second magnetization free layers, an underlayer and a protective layer, which are stacked in the order of the underlayer, the first magnetization free layer, the intermediate layer, the second magnetization free layer and the protective layer and arranged to be substantially perpendicular to an air-bearing surface, each magnetization direction of which first and second magnetization free layers is allowed to vary independently in response to a signal magnetic flux from a medium, wherein first and second magnetization free layers produce a magnetoresistance effect in accordance with the magnetization directions thereof; and a first electrode electrically connected with the underlayer and a second electrode electrically connected with the protective layer, the first and second electrodes allowing a current to flow in a direction substantially perpendicular to the plane of the magnetoresistive film.

According to another aspect of the present invention, there is provided a perpendicular magnetic recording-reproducing apparatus, comprising a perpendicular magnetic recording medium and the above magnetoresistive head arranged to face the perpendicular magnetic recording medium.

DETAILED DESCRIPTION OF THE INVENTION

A magnetic head according to an embodiment of the present invention comprises a magnetoresistive film including a first magnetization free layer (a first free layer), a second magnetization free layer (a second free layer), an intermediate layer (a spacer layer) sandwiched between these free layers, an underlayer and a protective layer, and first and second electrodes allowing a current to flow in a direction substantially perpendicular to the plane of the magnetoresistive film. That is, the magnetoresistive film is a CPP-MR film. Constituent films of the magnetoresistive film such as the first free layer, the intermediate layer and the second free layer are arranged to be substantially perpendicular to the air-bearing surface. In the magnetoresistive film, the underlayer, the first free layer, the intermediate layer, the second free layer and the protective layer are stacked in this order from the substrate side. Each magnetization direction of the first and second free layers is allowed to vary independently in response to a signal magnetic flux from a medium such as a perpendicular recording medium. The first and second free layers produce a magnetoresistance effect in accordance with change in their magnetization directions.

A sensing area of the magnetic head of the embodiment is a part of the magnetoresistive film sandwiched between the first and second electrodes. The sensing area includes the first free layer, the intermediate layer and the second free layer, but does not include a magnetic gap layer formed of an insulator, an antiferromagnetic layer and a magnetization pinned layer (pinned layer). Therefore, the magnetic head of the embodiment permits narrowing the gap and is capable of coping with a high recording density, compared with the conventional SV-MR film.

In order to impart magnetic anisotropies to the first free layer and the second free layer in a desired direction such a structure as described below will be adopted.

For example, a pair of hard biasing films may be provided on the both ends, along the track width direction, of the magnetoresistive film including the first magnetization free layer, the intermediate layer and the second magnetization free layer so as to impart magnetic anisotropies to the first and second magnetization free layers in substantially one direction.

Also, a pair of first antiferromagnetic films may be provided on the both ends of the first magnetization free layer along the track width direction, by which magnetization in the both end portions is pinned, so as to impart a magnetic anisotropy to the central portion of the first free layer in a predetermined direction, and at the same time, a pair of second antiferromagnetic films may be provided on the both ends of the second magnetization free layer along the track width direction, by which magnetizations in the both end portions is pinned, so as to impart a magnetic anisotropy to the central portion of the second free layer in a predetermined direction. In this case, it is preferable that the direction of the magnetic anisotropy in the central portion of the first free layer and the direction of the magnetic anisotropy in the central portion of the second free layer make an angle of about 90°. However, the angle between the directions of the magnetic anisotropies imparted to the two free layers may be in a range from 60° to 120°.

Each magnetization direction of the first and second free layers to which magnetic anisotropies are imparted as described above is independently changed in response to a signal magnetic flux from the medium, which produces a magnetoresistance effect in accordance with change in magnetization directions. As a result, the magnetic head of the embodiment of the present invention can read out information recorded in the medium. Note that, the medium flux is detected based on various principles in accordance with the manner how the magnetic anisotropies are imparted to the first and second free layers. The detection principles will be described in detail herein later.

The free layer is formed of a ferromagnetic material containing a metal selected from Co, Fe or Ni, or an alloy of such metals. Specifically, examples of ferromagnetic material used for the free layer include $Co_{90}Fe_{10}$ (at %), CoFeNi, NiFe, Fe, Co, Ni, and so on.

In order to produce the spin dependent scattering effect within the free layer, the free layer may be formed into a stacked structure of [ferromagnetic layer/ferromagnetic layer], a stacked structure of [ferromagnetic layer/nonmagnetic layer], or a composite structure thereof.

For the stacked free layer of the [ferromagnetic layer/ferromagnetic layer], combinations of [NiFe/CoFe], [Fe/NiFe] and [Fe/CoFe] may be employed.

In the case of the stacked free layer of the [ferromagnetic layer/nonmagnetic layer], a noble metal selected from the group consisting of Au, Ag, Cu, Ir, Ru, Rh, Pd and Pt is employed for the nonmagnetic layer. Examples of combinations of the [ferromagnetic layer/nonmagnetic layer] that increases the scattering at the interface include, for example, [NiFe/Au], [NiFe/Ag], [CoFe/Cu], [Co/Cu], [Fe/Au] and [Ni/Au].

A ferrimagnetic coupling free layer (a synthetic free layer) formed of [magnetic layer/Ru/magnetic layer] may be employed for the free layer so as to adjust a product of the saturation magnetization and the thickness (Ms·t product).

In the embodiment of the present invention, an underlayer and a protective layer are formed to have a magnetoresistive film sandwiched therebetween, the magnetoresistive film including a first free layer, an intermediate layer and a second free layer. Examples of the underlayer and the protective layer include a metal layer such as Ta, etc, a soft magnetic underlayer improving the soft magnetic characteristics of the free layer, an orientation controlling layer improving the crystal orientation of the free layer, and a specular layer for utilizing a specular reflection effect of the electron. The soft magnetic underlayer includes, for example, a $Ni_{80}Fe_{20}$ (at %) alloy (Permalloy) and amorphous CoZrNb. The orientation-controlling layer includes, for example, [Ru/Cu], [Au/Cu], Cu and a NiFeCr alloy. It is also possible to use the specific materials disclosed in U.S. Pat. No. 5,549,978 as the materials of the undercoating film for the soft magnetic underlayer and the orientation control layer noted above. Further, the specular layer includes, for example, an Fe oxide such as $\gamma$-$Fe_2O_3$ and $Fe_3O_4$; a Ta oxide; a Ni oxide; a Cr oxide such as $Cr_2O_3$ and $CrO_2$; and a Mn oxide.

It is possible to insert the aforementioned specular layer into the free layer of the intermediate layer. When the specular layer, or the insulating layer as described above such as the Cr oxide, is inserted into the intermediate layer, a nonmagnetic conductive intermediate layer formed of, for example, a Cu layer is preferably employed. The thickness of the nonmagnetic conductive intermediate layer in this case should preferably be one nm or less. The nonmagnetic conductive intermediate layer may be formed on only one side of the insulating layer. The presence of the nonmagnetic conductive intermediate layer improves the soft magnetic characteristics of the first and/or second free layer.

In the embodiment of the present invention, it is desirable for the magnetoresistive film to be arranged between a pair of magnetic shields. If the magnetoresistive film is arranged between a pair of magnetic shields, it is possible to reduce a full width at half maximum ($PW_{50}$) of an output peak to a small level and to obtain satisfactory linear resolution.

In this case, it is desirable for the paired magnetic shields to be electrically connected with the first electrode and the second electrode, respectively. In this particular construction, it is possible to handle the electrode and the shield collectively as an electrode so as to lower the resistance of the electrode portion, thereby suppressing a thermal effect on the CPP-MR film.

In the magnetic head according to the embodiment of the present invention, if a magnetic circuit is formed in a pair of free layers and a magnetic gap, which determines linear resolution, is defined by the thickness of the intermediate layer, the shields may be omitted.

For the intermediate layer, employed is a nonmagnetic conductive material such as Be, Al, Mg, Ca, Cu. Au, Ag, Rh, Ru or Ir. In the case of using these materials, it is possible to obtain a sufficiently long spin diffusion length of about at least 50 nm and to obtain a large spin dependent scattering at the interface between a free layer and an intermediate layer.

The intermediate layer may be formed into a three-layered structure including a pair of first intermediate layers in contact with the first magnetization free layer and the second magnetization free layer, respectively, and a second intermediate layer formed to be interposed between the paired first intermediate layers. In this case, it is desirable for the first intermediate layer to be formed of at least one kind of a metal selected from the group consisting of Cu, Au, Ag, Rh, Ru and Ir, and for the second intermediate layer to be formed of at least one kind of a metal selected from the group consisting of Be, Al, Mg and Ca. The above first intermediate layer shows large spin dependent scattering effect at the interface between a free layer and an intermediate layer. The above second intermediate layer shows long spin diffusion length.

In another embodiment of the present invention, an oxide layer may be used for the intermediate layer. In this case, the magnetoresistive film is a so-called tunneling magnetoresistive film including a first free layer, an oxide intermediate layer and a second free layer. The oxide layer may be formed of at least one layer selected from the group consisting of Al oxide such as $Al_2O_3$, a Si oxide such as $SiO_2$, a Ta oxide, a Cr oxide such as $CrO_2$, a Fe oxide such as $Fe_3O_4$, and a perovskite type oxide such as LaSrMnO (LSMO). Taking the device resistance of the tunneling magnetoresistive film into consideration, the thickness of the oxide layer should preferably be about 5 nm or less.

In another embodiment of the present invention, the intermediate layer may be formed of a stacked film of [a metal layer/an oxide layer or nitride layer], or a sandwich film of [a metal layer/an oxide layer/a metal layer] or [a metal layer/a nitride layer/a metal layer]. In this case, the above oxide layer may be formed of at least one layer selected from the group consisting of Al oxide such as $Al_2O_3$, Si oxide such as $SiO_2$, a Fe oxide, a Ta oxide, a Ni oxide, a perovskite type oxide and a Cr oxide. In the case, above metal layer may be formed of at least one layer selected from the group consisting of Cu, Ru, Ag, Au, Ir, and Rh. The above metal layers control and prevent the oxidization of the free layers. As a result, soft magnetic properties of the free layers are improved, so the low coercive force of each free layer is obtained.

Embodiments of the present invention will now be described in detail with reference to the accompanying drawings.

(First Embodiment)

Figure 3A:
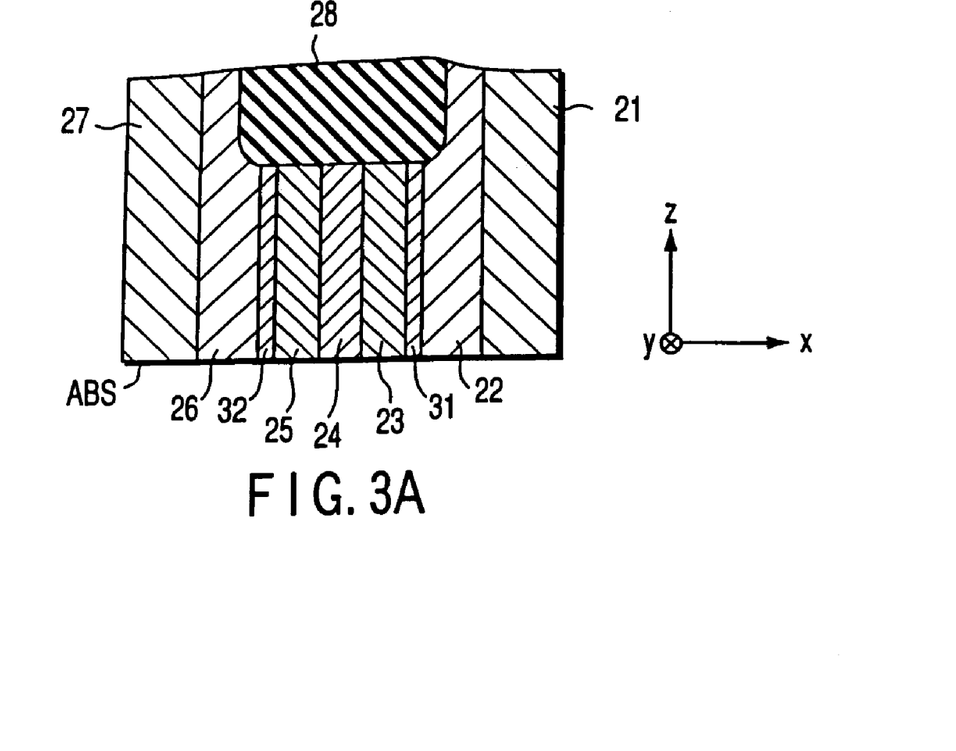
FIG. 3A is a cross sectional view of a current perpendicular to plane type magnetoresistive head (CPP-MR head) cut on a section perpendicular to the air-bearing surface according to a first embodiment of the present invention.

FIG. 3A is a cross sectional view of a current perpendicular to plane type magnetoresistive head (CPP-MR head) cut on a section perpendicular to the air-bearing surface (ABS) according to the first embodiment of the present invention. In this drawing, "x" represents the track direction, "y" represents the track width direction, and "z" represents the perpendicular direction to the air-bearing surface. The CPP-MR head is used in a perpendicular magnetic recording system.

As shown in FIG. 3A, the CPP-MR head comprises the lower magnetic shield 21, the first electrode 22, the underlayer 31, the first magnetization free layer (first free layer) 23, the spacer layer 24 formed of a nonmagnetic conductive layer 24, the second magnetization free layer (second free layer) 25, the protective layer 32, the second electrode 26 and the upper magnetic shield 27, which are stacked in the order mentioned.

The film surfaces of the first free layer 23, the second free layer 25, and the spacer layer 24 interposed between the first and second free layers 23 and 25, which constitute the CPP-MR film, are substantially perpendicular to the air-bearing surface. The magnetization of each of the first free layer and the second free layer responds freely to a signal flux generated from the recorded magnetic recording medium. As described herein later, magnetoresistance change is generated in accordance with an angle made between the magnetization directions of the first and second free layers so as to make it possible to read out the medium flux.

An insulating film 28 is formed in a position apart in the z-direction from the ABS of the first electrode 22, the underlayer 31, the first free layer 23, the spacer layer 24, the second free layer 25, the protective layer 32 and the second electrode 26. The first electrode 22 and the second electrode 26 allow the current to flow through the CPP-MR film in a direction perpendicular to the film plane. Each of the first and second electrodes 22 and 26 is formed mainly of a metal selected from the group consisting of Cu, Au, Ag and Ta or an alloy thereof. In the CPP-MR head, it is possible to obtain good linear resolution regardless of the presence or absence of the magnetic shields and, thus, it is not necessary to arrange the magnetic shields. However, it is desirable to arrange the magnetic shields 21 and 27 because the linear resolution can be further improved.

Figure 3B:
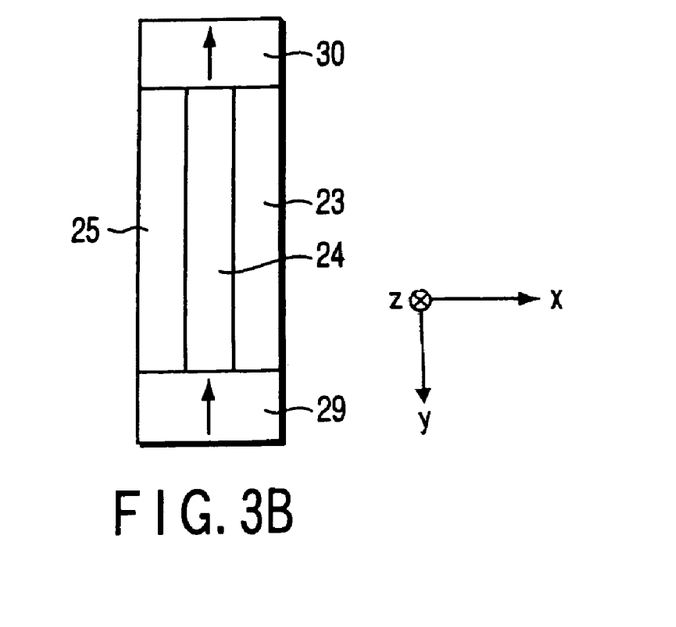
FIG. 3B is a plan view of the CPP-MR film in the CPP-MR head shown in FIG. 3A, viewed from the air-bearing surface.

FIG. 3B is a plan view of the CPP-MR film in the CPP-MR head shown in FIG. 3A, viewed from the air-bearing surface. As shown in the drawing, the CPP-MR film, including the first free layer 23, the spacer layer 24 and the second free layer 25, is arranged between a pair of hard biasing films (hard films) 29 and 30. The hard films 29 and 30 apply a biasing magnetic field to the first free layer 23 and the second free layer 25 so as to impart magnetic anisotropy in one direction.

Figure 4A:
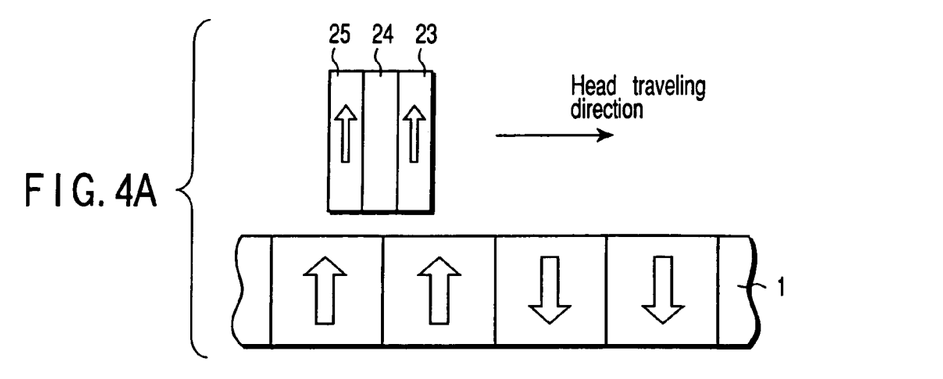
FIGS. 4A to 4C are diagrams schematically showing the magnetization direction of the magnetoresistive film relative to the medium flux in respect of the CPP-MR head according to the first embodiment of the present invention.
Figure 4B:
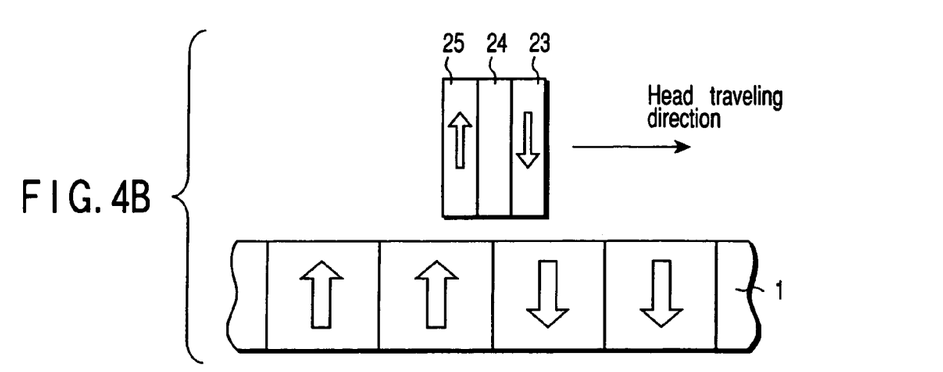
Figure 4C:
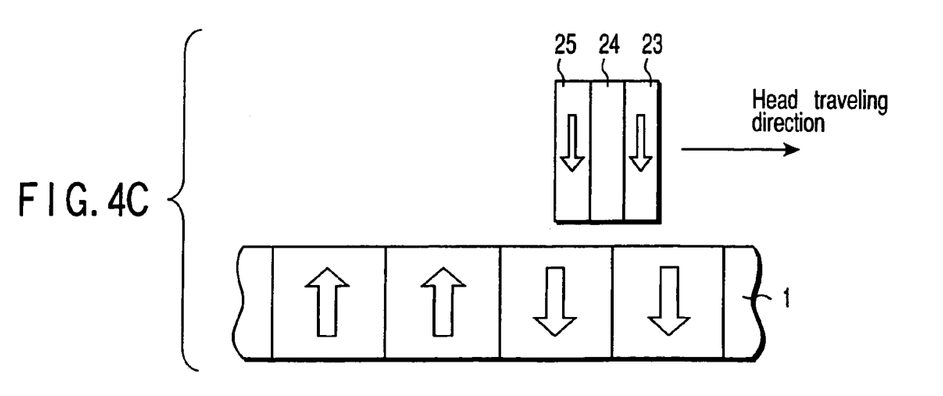

The output mechanism of the CPP-MR head of the embodiment will now be described. Each of FIGS. 4A to 4C is for schematically explaining change in the magnetization direction in the magnetoresistive film relative to the medium flux. These drawings show the first free layer 23, the spacer layer 24 and the second free layer 25 of the MR film and the perpendicular recording layer 1 in the longitudinal direction of a track. FIG. 4A covers the case where the head travels above the recorded domains where the up magnetizations are continued. FIG. 4B covers the case where the head travels above a transition region between the up magnetization and the down magnetization. Further, FIG. 4C covers the case where the head travels above recorded domains where the down magnetizations are continued.

In accordance with change in positional relationship between the MR film and the medium, the magnetization directions of the first and second free layers are allowed to vary in response to the directions of the recorded magnetizations in the medium as follows. As shown in FIG. 4A, where the up magnetizations are continued within the medium, each of the first free layer and the second free layer is magnetized in the upward direction, with the result that the magnetization directions of the first and second free layers are rendered parallel to each other. Above the magnetization transition region of the in the medium, the magnetization of the first free layer 23 on the leading side is changed into the downward direction, while the magnetization of the second free layer 25 on the trailing side is left unchanged (upward direction), as shown in FIG. 4B, with the result that the magnetization directions of the first and second free layers are rendered antiparallel to each other. Further, where the down magnetizations are continued within the medium, each of the first free layer and the second free layer is magnetized in the downward direction, with the result that the magnetization directions of the first and second free layers are rendered parallel to each other, as shown in FIG. 4C.

Figure 5:
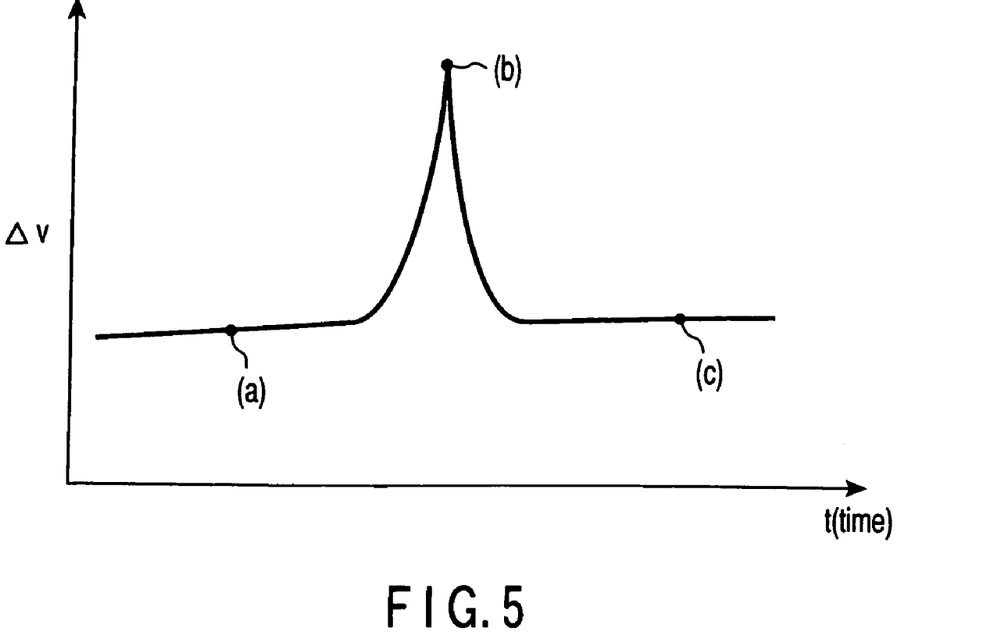
FIG. 5 is a graph schematically showing the output waveform of the CPP-MR head according to the first embodiment of the present invention.

FIG. 5 schematically shows the output waveform ($\Delta V = I \cdot \Delta \rho$) of the CPP-MR head according to the embodiment. The output values of (a), (b) and (c) shown in FIG. 5 correspond to the states of FIGS. 4A, 4B and 4C, respectively.

The waveform shown in FIG. 5 is substantially equal to that obtained from a longitudinal magnetic recording system using the conventional MR head. It follows that it is possible to sense a signal flux without modifying the circuit and the system of the reproduced signal processing section included in the magnetic recording-reproducing apparatus.

Figure 6:
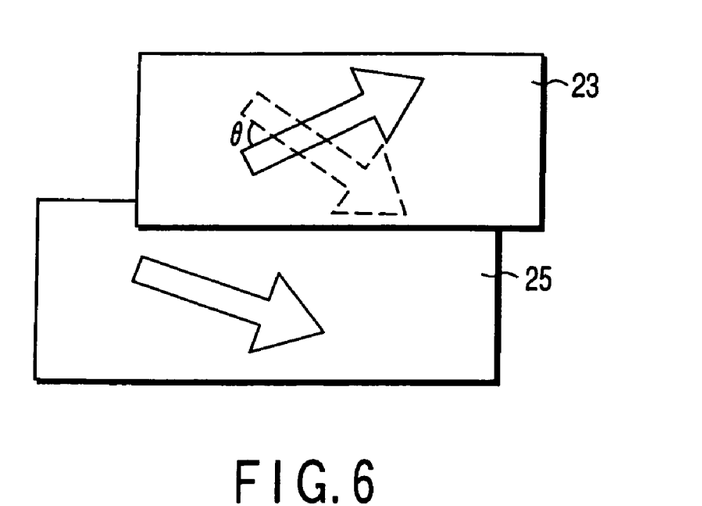
FIG. 6 is a diagram explaining the principle of obtaining the output waveform shown in FIG. 5.

FIG. 6 is for explaining the principle for the output waveform shown in FIG. 5 to be obtained. FIG. 6 corresponds to FIG. 4B. As shown in the drawing, the magnetization direction of the first free layer makes an angle θ with the magnetization direction of the second free layer.

It should be noted that the resistance change $\Delta\rho$ can be represented by the formula (1) given below by using the angle $\theta$ made between the magnetization directions of shown in FIG. 6:

$$\Delta\rho = \Delta\rho_{max} \cdot \cos(\theta/2) = (\rho_{AP} - \rho_P) \cdot \cos(\theta/2) \quad (1)$$

where $\rho_P$ represents the resistance of the magnetoresistive film in the case where the of magnetization directions of the first and second free layers are parallel to each other, $\rho_{AP}$ represents the resistance of the magnetoresistive film in the case where the magnetization directions of the first and second free layers are antiparallel to each other, and $\Delta\rho_{max}$ represents the maximum change in resistance.

Incidentally, $\Delta\rho$ can also be represented by: $\Delta\rho = \rho_P \cdot MR$, by using the MR change rate:

$$MR = (\rho_{AP} - \rho_P)/\rho_P.$$

It follows that the output change $\Delta V$ can be represented by the formula (2) given below:

$$\Delta V = I \cdot \Delta\rho = I \cdot (\rho_{AP} - \rho_P) \cdot \cos(\theta/2) \quad (2)$$

It follows that the output change $\Delta V$ can be obtained by only the movements of the magnetizations of the first and second free layers. However, the movements of magnetizations of the free layer are also dependent actually on distribution of the medium flux.

Figure 8:
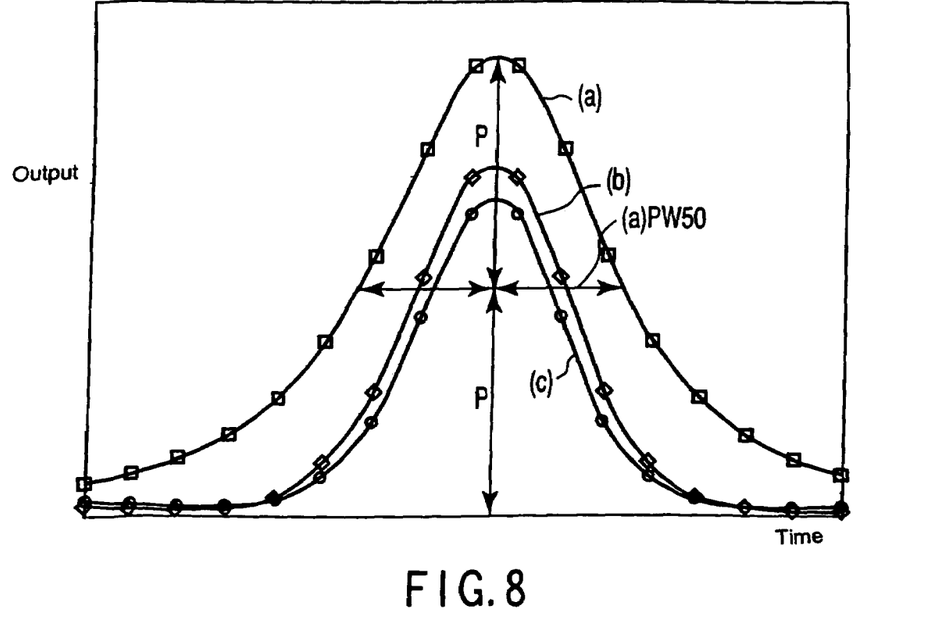
FIG. 8 is a graph showing output waveforms obtained under the conditions of FIG. 7A.

In designing the CPP-MR head, it is important to set appropriately the coercive force (Hc) of the medium film, the transition length (TL) on the medium, the magnetic distance (MS) between the medium and the head, the full width at half maximum of the pulse ($PW_{50}$), which is shown in FIG. 8, and the thickness of the spacer ($t_{spacer}$).

The thickness of the spacer is determined by the spin diffusion length within the spacer layer. It is undesirable for the thickness of the spacer layer to be large because the output pulse width is broadened if the thickness of the spacer layer is increased. On the contrary, if the thickness of the spacer layer is excessively small, the magnetic flux sensing efficiency of the MR head is lowered. In order to improve the magnetic flux sensing efficiency, it is necessary to set appropriately the dimensions of the CPP-MR film.

Figure 7A:
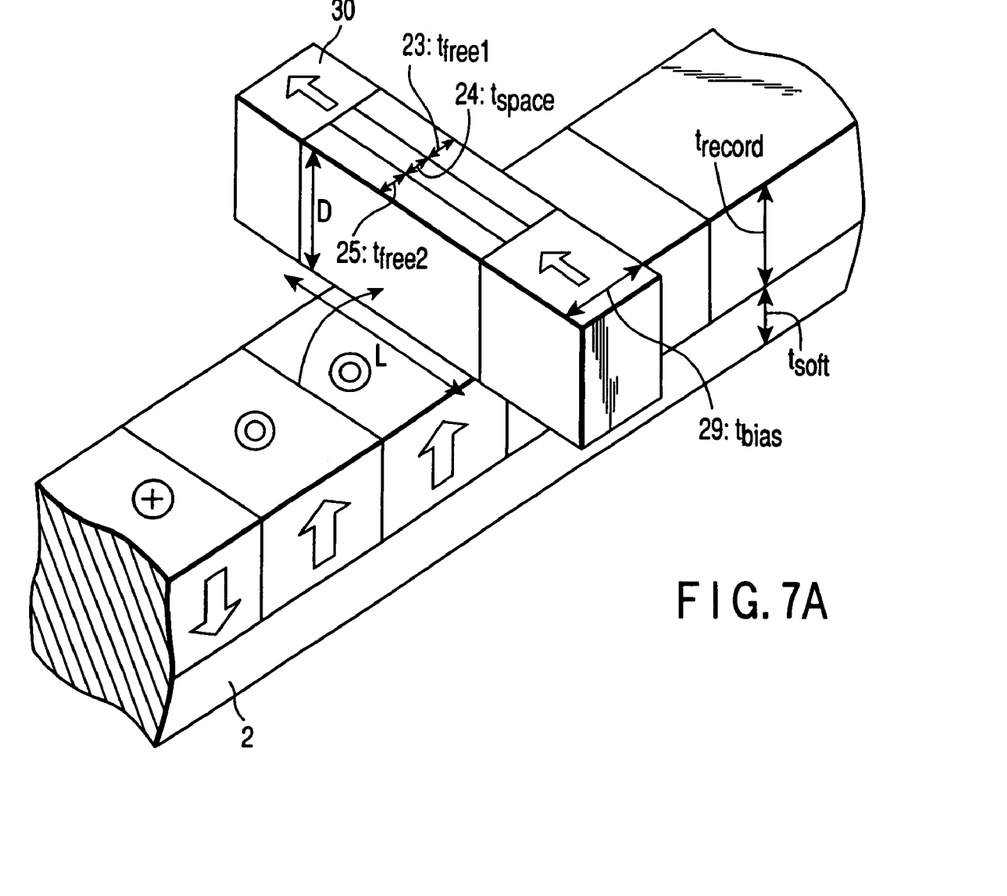
FIG. 7A is a perspective view showing parameters of the CPP-MR head and the recording medium in the first embodiment of the present invention.

FIG. 7A shows parameters of the CPP-MR head and the recording medium in the first embodiment. Here, supposing that the depth of the CPP-MR device is D, the thickness of each free layer is $t_{free1} = t_{free2} = tf$, permeability of the free layer is $\mu$, and the thickness of the spacer layer is $t_{spacer}$. Under such conditions, the attenuation length FD of the magnetic flux in the CPP-MR head without shields can be represented by the formula (3) given below:

$$FD = \sqrt{\frac{\mu \cdot tf \cdot t_{spacer}}{2}} \quad (3)$$

According to research conducted by the present inventors, it is desirable for the thickness of the spacer layer to fall within a range of between 2 nm and 50 nm, more desirably between 5 nm and 30 nm. If the thickness of the spacer layer is less than 2 nm, the magnetic flux sensing efficiency is lowered, and the output is lowered. On the other hand, if the thickness of the spacer layer exceeds 50 nm, the MR change rate is lowered.

The thickness of the spacer layer $t_{spacer}$ is determined by the formula (4) given below:

$$t_{spacer} = \frac{2 \cdot FD^2}{\mu \cdot tf} \quad (4)$$

It follows that it is desirable for the right term of the formula (4) given above to meet the relationship (5) given below:

$$2 \text{ (nm)} \leq \frac{2 \cdot FD^2}{\mu \cdot tf} \leq 50 \text{ (nm)} \quad (5)$$

In the case of a recording density of 100 Gbpsi or more, for example, the permeability $\mu$ is 100 and the free layer thickness tf is 2 nm to 10 nm. It follows that the attenuation length FD is:

14 (nm) $\leq$ FD $\leq$ 160 (nm).

Figure 7B:
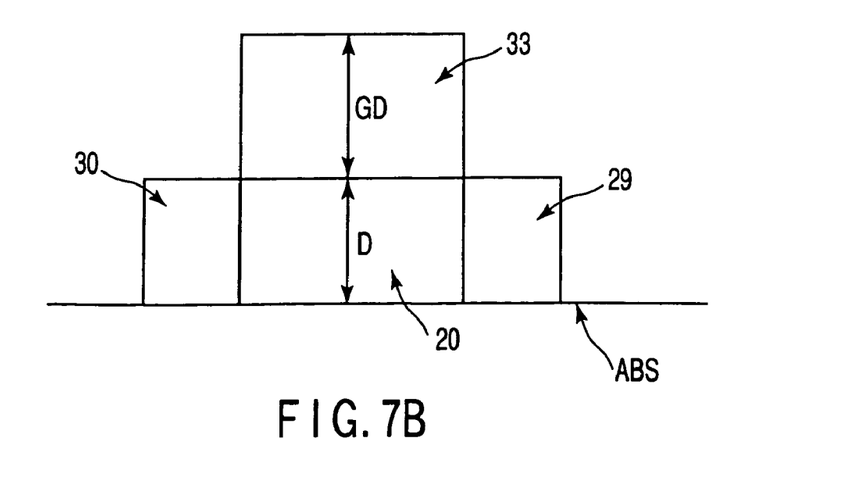
FIG. 7B shows a state that a rear flux guide is arranged to the CPP-MR head in the first embodiment of the present invention.

In order to improve the magnetic flux efficiency, it is desirable for the depth D of the MR film to be larger than the attenuation length FD so as to meet the condition of: $D \geq FD$. In this case, it is possible to increase the depth of the free layer alone. Also, it is possible to improve effectively the magnetic flux efficiency, as in the case of increasing the depth D of the MR film, by providing a rear flux guide 33 in the rear portion of the MR film 20 as shown in FIG. 7B in place of increasing the depth D of the MR film. In this case, it is desirable to satisfy the condition of: $D+GD \geq FD$, where GD represents the length of the rear flux guide 33. It follows that, in the recording density not lower than 100 Gbpsi, it is desirable to satisfy the condition of: $D \geq 160$ nm or $D+GD \geq 160$ nm.

An example of estimated output in the case of using the CPP-MR head shown in FIG. 7A will now be described.

Concerning the CPP-MR film, it is assumed that the material for each of the first and second free layers 23 and 25 is NiFe/CoFe, the material for the spacer layer 24 is Cu, the thickness $t_{free1}$ of the first free layer 23, which is equal to the thickness $t_{free2}$ of the second free layer 25, is 5 nm, the thickness $t_{spacer}$ of the spacer layer is 20 nm, the depth D is 100 nm and the length in the track width direction is 100 nm. Concerning the hard biasing films, it is assumed that the material for each of the hard biasing films 29 and 30 is CoCrPt, whose magnetizations are directed to one direction, where each biasing film has the thickness $t_{bias}$ of 40 nm, and the remanent magnetization $Mr_{bias}$ of 500 emu/cc. Concerning the medium, it is assumed that the medium has a stacked structure of the perpendicular recording layer 1 and the soft magnetic backing layer 2, where the recording layer 1 has the thickness $t_{record}$ of 10 nm and the remanent magnetization $Mr_{record}$ of 400 emu/cc and the backing layer 2 has the thickness $t_{soft}$ of 10 nm. The magnetization transition between adjacent bits is assumed to be a tanh type and the transition length TL is 10 nm. Further, the magnetic spacing between the CPP-MR head and the medium is assumed to be 10 nm.

FIG. 8 shows the output waveforms obtained under the conditions described above. The curve (a) in FIG. 8 covers the case where shields are not used, the curve (b) covers the case where the distance between the shields is set at 70 nm, and the curve (c) covers the case where the distance between the shields is set at 50 nm. As shown in FIG. 8, the value of $PW_{50}$, i.e., the full width at half maximum half-width of the output, is decreased with decrease in the distance between the shields. Incidentally, the peak value of the output is also decreased with decrease in the distance between the shields. However, the decrease of the peak value in this case is not so large as to generate a problem.

(Second Embodiment)

Figure 9:
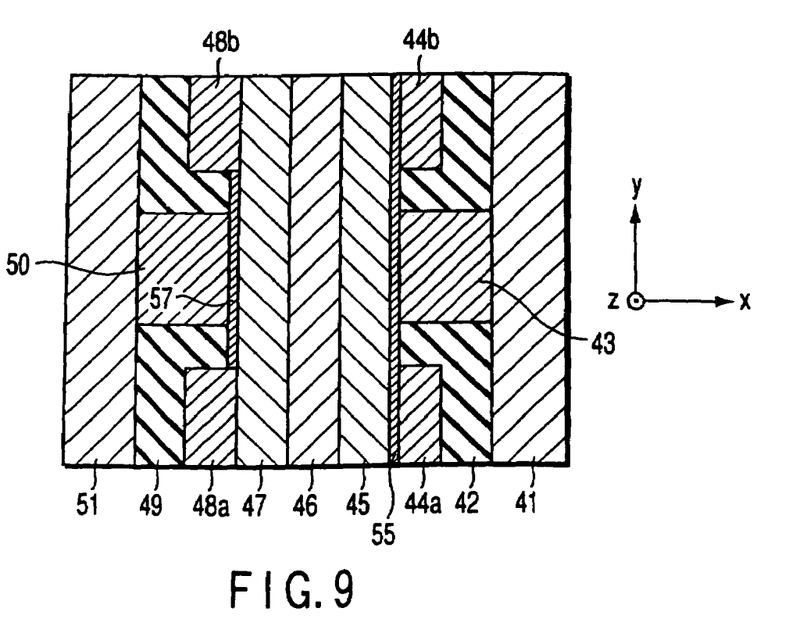
FIG. 9 is a cross sectional view of a current perpendicular to plane type magnetoresistive head (CPP-MR head) cut on a section perpendicular to the air-bearing surface according to a second embodiment of the present invention.

FIG. 9 is a cross sectional view of a CPP-MR head cut on a section perpendicular to the air-bearing surface according to the second embodiment. The insulating layer 42 is formed on the lower shield 41, and a part of the insulating layer 42 is etched, to which etched portion the pillar-shaped first electrode 43 is formed in contact with the lower shield 41. A pair of patterned first antiferromagnetic layers 44a and 44b is formed on the insulating layer 42 at both sides of the first electrode 43 as a center along the track width direction (y direction). The underlayer 55 is formed on entire surface of the first electrode 43, the insulating layer 42 and the first antiferromagnetic layers 44a and 44b. The CPP-MR film, including the first free layer 45, the spacer layer 46 and the second free layer 47, is formed on the underlayer 55. The protective layer 57 is formed on a part of the second free layer 47. A pair of patterned second antiferromagnetic layers 48a and 48b is formed in contact with the second free layer 47 at both sides along the track width direction (y direction). The insulating layer 49 is formed on the protective layer 57 and the second antiferromagnetic layers 48a and 48b, and a part of the insulating layer 49 is etched, to which etched portion the pillar-shaped second electrode 50 is formed in contact with the protective layer 57. The upper shield 51 is formed on the second electrode 50 and the insulating layer 49.

The free layers and the spacer layer can be formed of such materials that described in the first embodiment.

Examples of materials used for the underlayer and the protective layer include a nonmagnetic metal, such as Ta, Ti, Cu, Ru, Au and Cr, and a soft magnetic material, such as NiFe (Permalloy) and amorphous CoZrNb.

Examples of materials used for the antiferromagnetic layers include a PtMn alloy, a PtPdMn alloy, a CrMn alloy, a CrPtMn alloy, an IrMn alloy and an RhMn alloy. The patterned antiferromagnetic layers can be formed by the following methods. (i) After deposition of an antiferromagnetic material, resist patterning is performed by photolithography, and then ion milling is performed with using the resist pattern as a mask to form patterned antiferromagnetic layers, followed by removing the resist pattern. (ii) Resist patterning is performed by photolithography, followed by removing a part of the protective layer on the free layer and subsequently depositing an antiferromagnetic layer. Then, the resist pattern and the antiferromagnetic layer thereon are removed by a lift-off method to form patterned antiferromagnetic layers.

Examples of materials used for the insulating layer between the antiferromagnetic layer and the electrode include $SiO_2$, $Al_2O_3$, etc. However, where the antiferromagnetic layer has resistivity sufficiently higher than that of the free layer, the insulating layers need not be formed. When the insulating layer is formed, it is sufficient to form the insulating layer on one side of the electrodes. However, it is more desirable for the insulating layers to be formed on both sides of the electrodes. The size of the contact portion between the electrode and the free layer is defined by the opening formed in the insulating layer.

In this CPP-MR head, a sensing area is a part of the magnetoresistive film sandwiched between the first electrode 43 and the second electrode 50. The sensing area includes the first free layer 45, the intermediate layer 46 and the second free layer 47. On the other hand, the patterned first and second ferromagnetic layers 44a, 44b, 48a and 48b are formed apart from the sensing area. Therefore, the CPP-MR head of this embodiment permits narrowing the gap, as in the case with the first embodiment.

The first ferromagnetic layers 44a and 44b force to pin the magnetizations of the both end portions of the first free layer 45, thereby imparting a magnetic anisotropy to the central portion of the first free layer 45 corresponding to the sensing area in a direction forming a predetermined angle relative to the air-bearing surface. Likewise, the second ferromagnetic layers 48a and 48b force to pin the magnetizations of the both end portions of the second free layer 47, thereby imparting a magnetic anisotropy to the central portion of the second free layer 47 corresponding to the sensing area in a direction forming a predetermined angle relative to the air-bearing surface. It is desirable that each of the magnetic anisotropy directions imparted to the first and second free layers 45 and 47 makes an angle of about 45° measured from the air-bearing surface and that their directions are substantially orthogonal with each other. However, it is acceptable for the angle made between the magnetic anisotropy directions imparted to the two free layers to fall within a range of between about 60° and 120°.

Specifically, the magnetic anisotropy is imparted to the free layer by annealing with utilizing exchange coupling between the antiferromagnetic layers and the free layer. Therefore, two-stage annealing is performed so as to impart magnetic anisotropies to the first and second free layers, respectively. In order for the magnetic anisotropy already imparted to the first free layer not to be affected by the second-stage annealing, the first and second antiferromagnetic layers are designed to be different in thickness or in composition from each other, thereby controlling a blocking temperature and temperature characteristics of the exchange coupling magnetic field thereof.

In the case where, the magnetic anisotropy in the free layer is controlled by means of a pair of patterned antiferromagnetic layers as shown in FIG. 9, it is desirable to set appropriately the distance L between the antiferromagnetic layers. It is preferable to set the distance L between the patterned antiferromagnetic layers to 0.5 $\mu$m or less. If the distance L is larger than 0.5 $\mu$m, it is hard to control the magnetic anisotropy of that portion of the free layer interposed between the antiferromagnetic layers so as to generate a large coercive force. Further, Barkhausen noise is brought about. It is more desirable for the distance L to be not larger than 0.2 $\mu$m, because it is generally said that the spin coupling length is 0.2 $\mu$m or less.

The operating principle of the CPP-MR head according to this embodiment will now be described. In order to detect a medium flux by means of the magnetic head of the embodiment, two techniques as described below, for example, may be employed.

Figure 10:
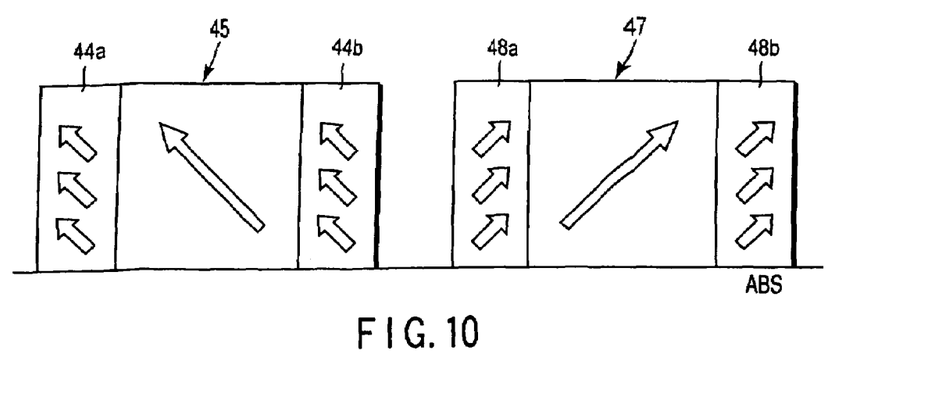
FIG. 10 is a diagram showing an example of magnetic anisotropy directions imparted to a pair of free layers in the CPP-GMR head shown in FIG. 9.
Figure 11:
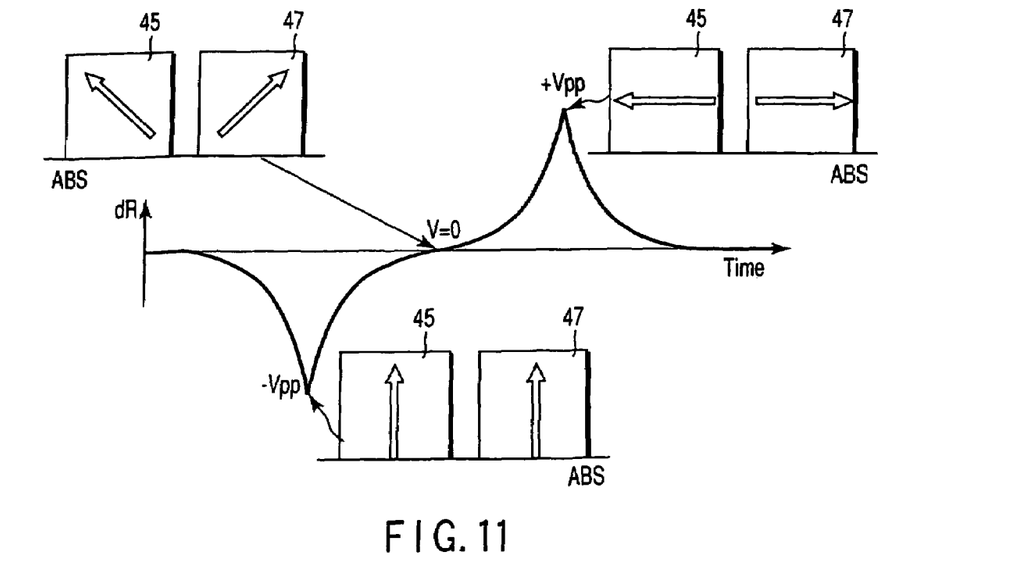
FIG. 11 is a graph showing an output waveform obtained by a CPP-GMR head having a pair of free layers to which magnetic anisotropies are imparted as shown in FIG. 10.

Referring to FIGS. 10 and 11, a first technique to detect a medium flux will be described.

FIG. 10 is a diagram showing an example of magnetic anisotropy directions imparted to a pair of free layers in the CPP-GMR head shown in FIG. 9. For the sake of easy understanding, the first free layer 45 and the second free layer 47 are depicted as if the layers are arranged side-by-side in this drawing. Actually, the second free layer 47 is overlapped the first free layer 45. In FIG. 10, the magnetic anisotropy direction in the first free layer 45 is directed upward with inclined by about +45° measured from the air-bearing surface, while the magnetic anisotropy direction in the second free layer 47 is directed upward with inclined by about −45° measured from the air-bearing surface. Therefore, the magnetic anisotropy direction in the first free layer 45 and that in the second free layer 47 are substantially orthogonal with each other.

FIG. 11 is a graph showing an output waveform obtained by the CPP-GMR head having a pair of free layers to which magnetic anisotropies are imparted as shown in FIG. 10.

In the case where the head travels above the recorded domains where the up magnetizations are continued, each of the first free layer 45 and the second free layer 47 is magnetized in the upward direction, with the result that the magnetization directions of the first and second free layers are rendered parallel to each other. In this case, the output voltage shows a minimum value of $-V_{pp}$.

In the case where the head travels above a magnetization transition region, the magnetization directions of the first free layer 45 and the second free layer 47 remain being substantially orthogonal with each other. In this case, the output voltage shows a value of approximately zero.

In the case where the head travels above recorded domains where the down magnetizations are continued, each of the first free layer 45 and the second free layer 47 is magnetized in the horizontal direction, and their directions are rendered antiparallel to each other. In this case, the output voltage shows a maximum value of $+V_{pp}$.

As described above, it is possible to detect directly the magnetization directions of the record bits in the recording medium. In the case of employing the particular operating principle, since the magnetic flux flows from the first free layer 45 or the second free layer 47 to the lower shield 41 or the upper shield 51, it is necessary to use a pair of magnetic shields.

Figure 12:
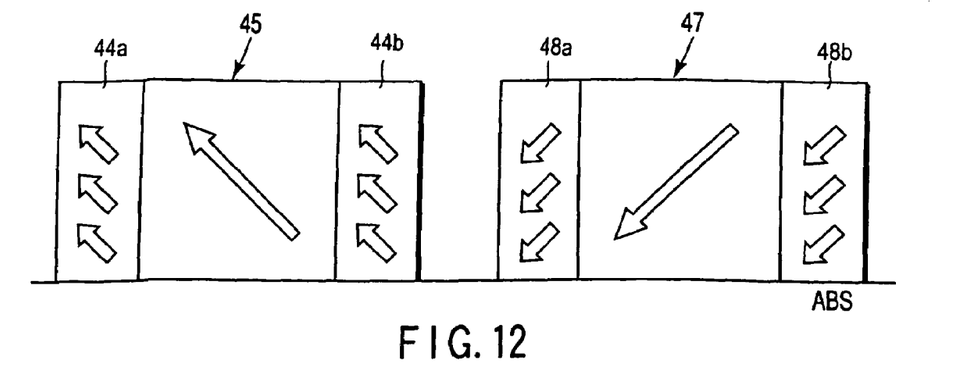
FIG. 12 is a diagram showing another example of magnetic anisotropy directions imparted to a pair of free layers in the CPP-GMR head shown in FIG. 9.
Figure 13:
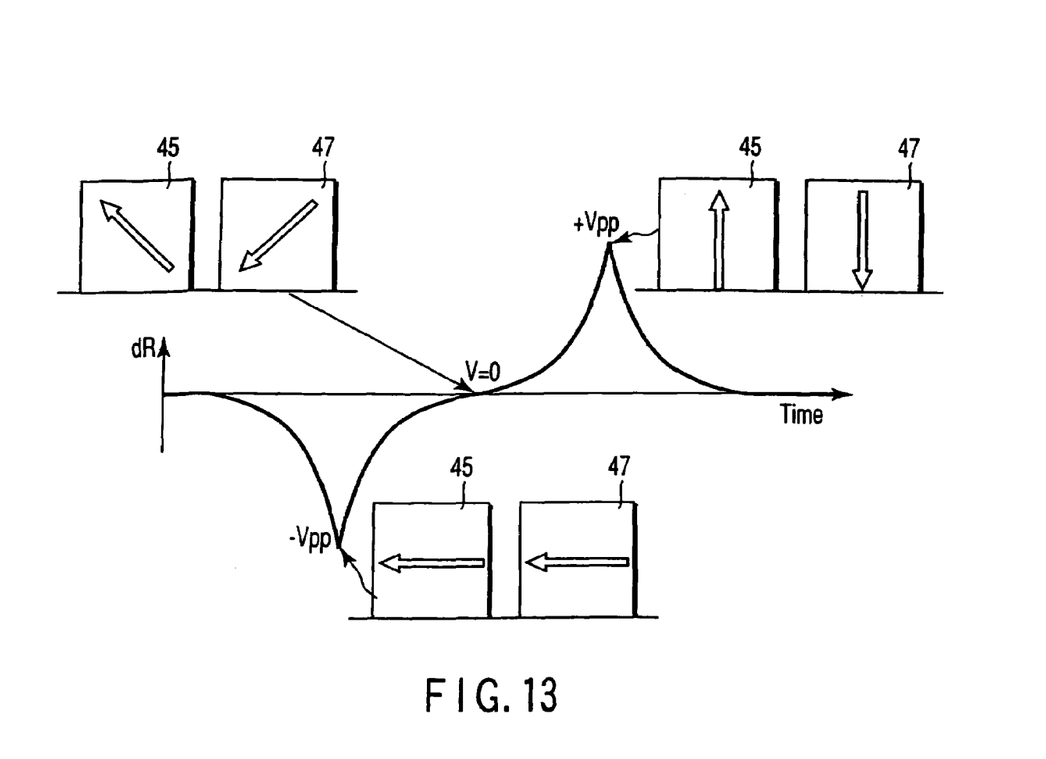
FIG. 13 is a graph showing an output waveform obtained by a CPP-GMR head having a pair of free layers to which magnetic anisotropies are imparted as shown in FIG. 12.

Referring to FIGS. 12 and 13, a second technique to detect a medium flux will be described.

FIG. 12 is a diagram showing another example of magnetic anisotropy directions imparted to a pair of free layers in the CPP-GMR head shown in FIG. 9. In FIG. 12, the magnetic anisotropy direction in the first free layer 45 is directed upward with inclined by about +45° measured from the air-bearing surface, while the magnetic anisotropy direction in the second free layer 47 is directed downward with inclined by about −45° measured from the air-bearing surface. Therefore, the magnetic anisotropy direction in the first free layer 45 and that in the second free layer 47 are substantially orthogonal with each other.

FIG. 13 is a graph showing an output waveform obtained by a CPP-GMR head having a pair of free layers to which magnetic anisotropies are imparted as shown in FIG. 12.

In the case where the head travels above a transition region from a down magnetization to an up magnetization, each of the first free layer 45 and the second free layer 47 is magnetized in the horizontal, and their directions are rendered parallel to each other. In this case, the output voltage shows a minimum value of $-V_{pp}$.

In the case where the head travels above recorded domains where the up magnetizations or down magnetizations are continued, the magnetization directions of the first free layer 45 and the second free layer 47 remain being substantially orthogonal with each other. In this case, the output voltage shows a value of approximately zero.

In the case where the head travels above a transition region from an up magnetization to a down magnetization, each of the first free layer 45 and the second free layer 47 is magnetized in the horizontal direction, and their directions are rendered antiparallel to each other. In this case, the output voltage shows a maximum value of $+V_{pp}$.

As described above, it is possible to detect transition regions between the record bits. In the case of employing the particular operating principle, since the magnetic flux flows from the first free layer 45 to the second free layer 47 or flows from the second free layer 47 to the first free layer 45, there need not always necessary to use a pair of magnetic shields.

(Another Embodiments).

Figure 14:
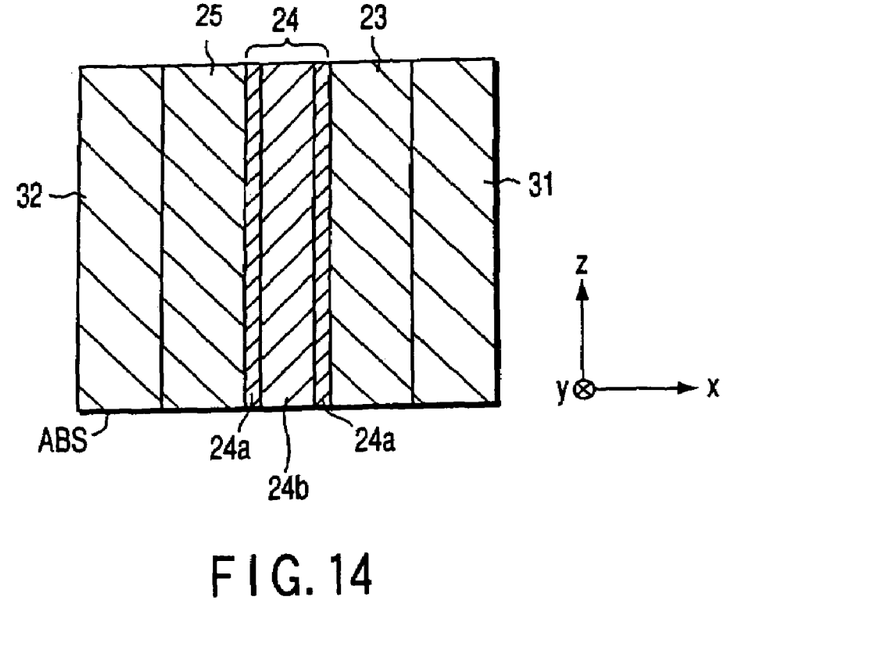
FIG. 14 is a cross sectional view showing the construction of a CPP-MR film according to another embodiment of the present invention.

FIG. 14 is a cross sectional view showing the construction of a CPP-MR film used for a CPP-MR head according to another embodiment of the present invention. The CPP-MR film shown in FIG. 14 comprises the underlayer 31, the first free layer 23, the spacer layer 24, the second free layer 25, and the protective layer 32, stacked in the order mentioned, like that shown in FIG. 3A. In the CPP-MR film shown in FIG. 14, however, the spacer layer 24 is of a three-layered structure including a pair of first spacer layers 24a, 24a in contact with the first free layer 23 and the second free layer 25, respectively, and the second spacer layer 24b interposed between the paired first spacer layers 24a.

As described above, the thickness of the spacer layer is very important in designing the CPP-MR head of the embodiment of the present invention. Therefore, in order to increase the degree of freedom of the design, it is necessary to select a material that permits setting a sufficiently long spin diffusion length for forming the spacer layer.

The material showing a large spin diffusion length includes a metal formed of an element having a low atomic weight, such as Al, Mg, Be and Ca, and an alloy thereof. The spin diffusion length of each of Al, Mg, Be and Ca is about 200 nm at room temperature. It follows that it is appropriate to use an Al or Mg layer in a part of the spacer layer. Also, the material having a low conductivity, such as Cu, Au, Ag, Rh, Ru and Ir, has a large spin diffusion length and, thus, can desirably be used for the spacer layer. According to research conducted by the present inventors, these materials are considered to have a spin diffusion length of at least 50 nm.

A particularly desirable stacked structure of the spacer layer includes a three-layered structure of [first spacer layer/second spacer layer/first spacer layer]. For the first spacer layer, employed is at least one metal selected from the group consisting of Au, Cu, Ag, Rh, Ir and Ru. For the second spacer layer, employed is at least one metal selected from the group consisting of Al, Mg, Be and Ca. In the stacked structure exemplified above, the spin diffusion length is adjusted by the second spacer layer, and the effect of the spin dependent scattering is produced at interfaces between each of the first spacer layers and the first free layer or the second free layer.

It is desirable for the thickness of the first spacer layer to be 10 nm or less in order to increase the spin diffusion length as much as possible. It is desirable for the thickness of the second spacer layer to be 200 nm or less so that the thickness of the second spacer layer is made smaller than the spin diffusion length.

Also, in view of the spin diffusion length within the free layer, it is desirable for the sum of the thickness of the free layers and the thickness of the spacer layer in the CPP-MR film to be not larger than 50% of the spin diffusion length in the second spacer layer. Incidentally, the thickness of the free layers represents the thickness of the portion contributing to the spin dependent scattering. In other words, the thickness of the free layer means the total thickness in the case of a simple free layer, and means the total thickness of the Ru layer and the magnetic layer on the side of the spacer layer in the case of a synthetic free layer.

Figure 15:
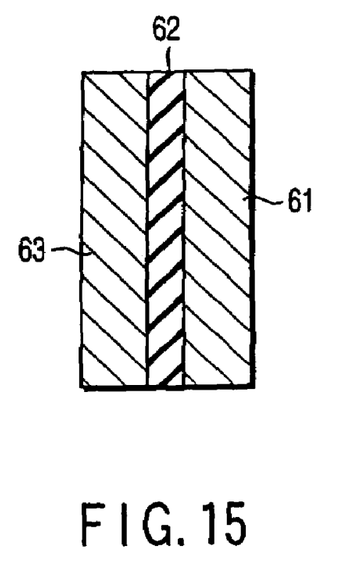
FIG. 15 is a cross sectional view showing the construction of a TMR film according to another embodiment of the present invention.
Figure 16:
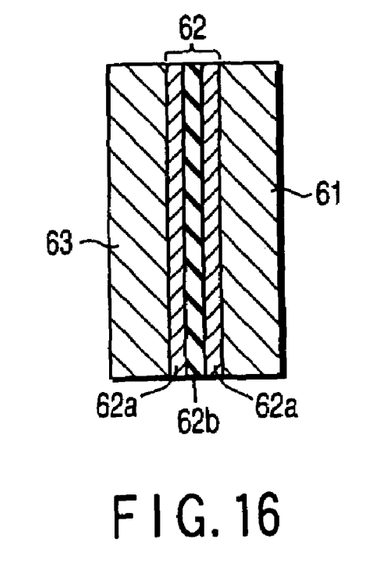
FIG. 16 is a cross sectional view showing the construction of a TMR film according to still another embodiment of the present invention.

A magnetoresistive film shown in FIG. 15 or FIG. 16 may be used for a magnetoresistive head according to another embodiment of the present invention.

FIG. 15 is a cross sectional view showing the construction of a tunneling magnetoresistive film (TMR film) in which the first free layer 61, the spacer layer 62 formed of an oxide such as $Al_2O_3$, and the second free layer 61 are stacked in the order mentioned. Taking the device resistance into consideration, the thickness of the spacer layer in the TMR film should preferably be 5 nm or less. At least one layer selected from the group consisting of $Al_2O_3$, a Fe oxide, such as $Fe_3O_4$, and a perovskite type oxide, such as LSMO, can be used for the spacer layer.

FIG. 16 is a cross sectional view showing the construction of a TMR film according to still another embodiment of the present invention, the TMR film having a similar structure to that in FIG. 15 except that the spacer layer 62 is formed of a stack of [metal layer 62a/oxide layer 62b/metal layer 62a] or [metal layer 62a/nitride layer 62b/metal layer 62a]. There is no need that the intermediate oxide layer or nitride layer 62b to be a continuous film, but the layer 62b may be a discontinuous film. Whether the intermediate oxide layer or nitride layer 62b is a continuous film or not can be confirmed through observation with an electron microscope. The spacer layer 62b in FIG. 16 may be a stack of [metal layer 62a/oxide layer or nitride layer 62b]. At least one layer selected from the group consisting of $Al_2O_3$, $SiO_2$, a Fe oxide, a perovskite type oxide and a Cr oxide can be used for the oxide layer 62b in FIG. 16.

A magnetic head assembly having the CPP-MR head according to an embodiment of the present invention mounted thereon and a magnetic disk apparatus having the magnetic head assembly mounted thereon will now be described with reference to FIGS. 17A and 17B.

Figure 17A:
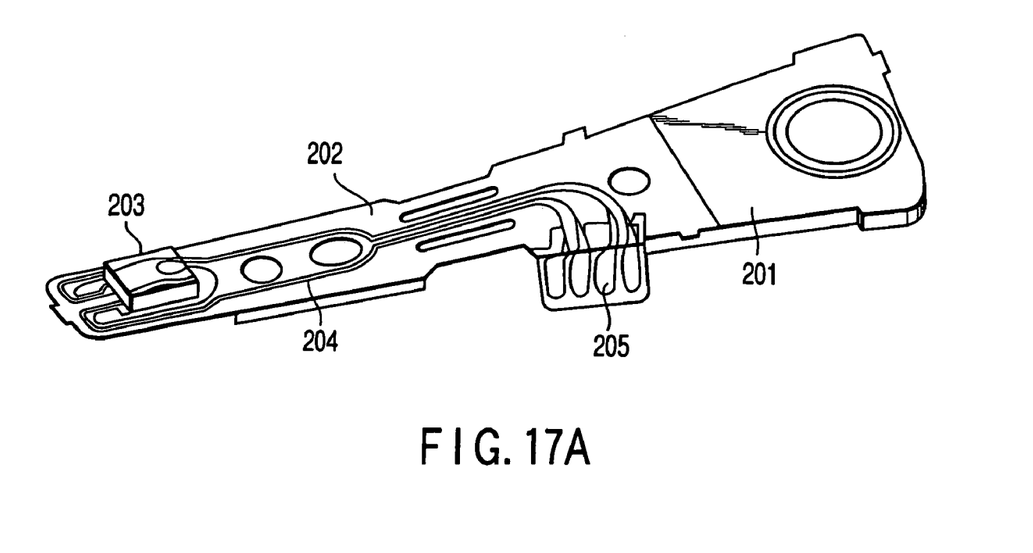
FIG. 17A is a perspective view showing a magnetic head assembly having a CPP-MR head according to an embodiment of the present invention.

FIG. 17A is a perspective view showing the magnetic head assembly having a CPP-MR head mounted thereon. As shown in the drawing, an actuator arm 201 is provided with a hole for fixation to the stationary shaft within the magnetic disk apparatus and includes a bobbin portion for holding a driving coil (not shown). A suspension 202 is fixed to one end of the actuator arm 201. A head slider 203 having the CPP-MR head mounted thereon is mounted to the tip of the suspension 202. Also, a lead wire 204 for writing and reading signals is arranged on the suspension 202. The lead wire 204 is connected at one end to each electrode of the CPP-MR head incorporated in the head slider 203 and is connected at the other end to an electrode pad 205.

Figure 17B:
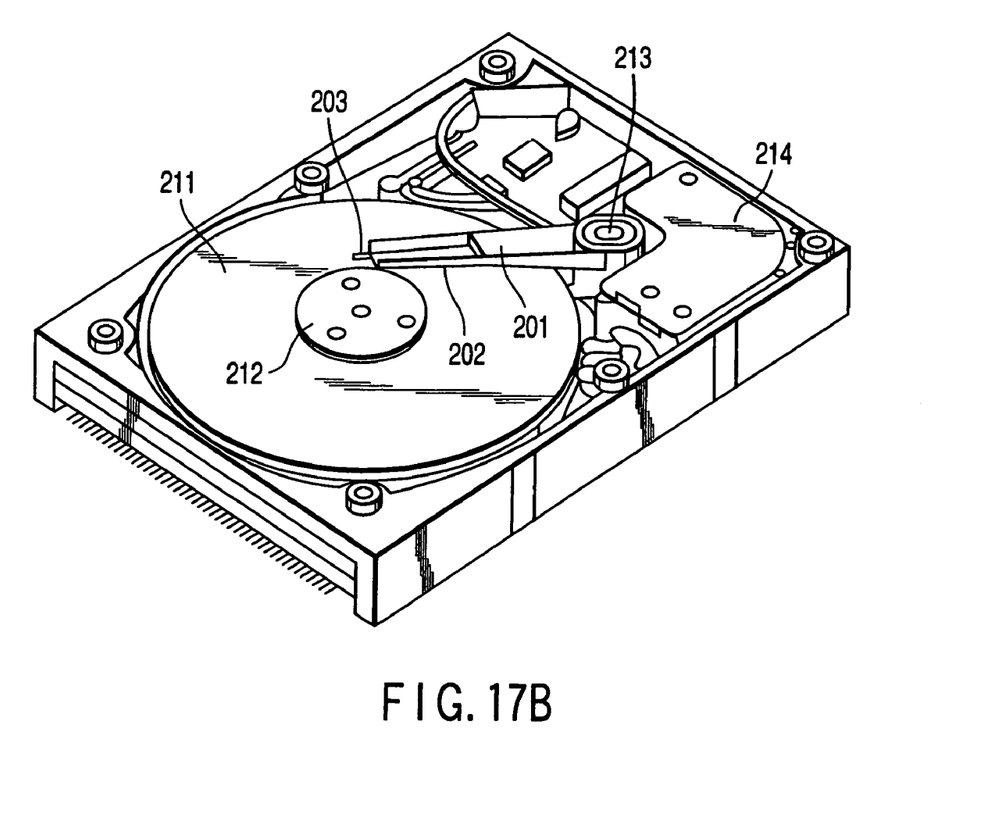
FIG. 17B is a perspective view showing the internal structure of the magnetic disk apparatus according to an embodiment of the present invention.

FIG. 17B is a perspective view showing the internal structure of the magnetic disk apparatus having the magnetic head assembly, which is shown in FIG. 17A, mounted thereon. A magnetic disk 211 is mounted to a spindle 212 and is rotated by a motor (not shown) responsive to control signals generated from the driver control section (not shown). The actuator arm 201 is fixed to a stationary shaft 213 so as to support the suspension 202 and the head slider 203 at the tip of the suspension 202. If the magnetic disk 211 is rotated, the air-bearing surface of the head slider 203 is held floating by a predetermined height from the surface of the magnetic disk 211 so as to carry out recording-reproducing of information. A voice coil motor 214, which is a kind of a linear motor, is mounted to the proximal end of the actuator arm 201. The voice coil motor 214 comprises a driving coil (not shown) wound about the bobbin portion of the actuator arm 201, and a magnetic circuit consisting of a permanent magnet and a counter yoke arranged to face each other with the driving coil interposed therebetween. The actuator arm 201 is supported by ball bearings (not shown) arranged in upper and lower portions of the stationary shaft 213 so as to be rotated by the voice coil motor 214.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A magnetoresistive head, comprising:
   a magnetoresistive film including first and second magnetization free layers, an intermediate layer sandwiched between the first and second magnetization free layers, an underlayer and a protective layer, which are stacked in the order of the underlayer, the first magnetization free layer, the intermediate layer, the second magnetization free layer and the protective layer and arranged to be substantially perpendicular to an air-bearing surface, each magnetization direction of which first and second magnetization free layers is allowed to vary independently in response to a signal magnetic flux from a medium, wherein first and second magnetization free layers produce a magnetoresistance effect in accordance with the magnetization directions thereof;
   a first electrode electrically connected with the underlayer and a second electrode electrically connected with the protective layer, the first and second electrodes allowing a current to flow in a direction substantially perpendicular to the plane of the magnetoresistive film;
   a pair of first antiferromagnetic films, one of said pair of first antiferromagnetic films arranged on each end of the first magnetization free layer in a track width direction, said pair of first antiferromagnetic films imparting a magnetic bias to the first magnetization free layer in a predetermined direction; and
   a pair of second antiferromagnetic films, one of said pair of second antiferromagnetic films arranged on each end of the second magnetization free layer in a track width direction, said pair of second antiferromagnetic films imparting a magnetic bias to the second magnetization free layer in a predetermined direction.

2. The magnetoresistive head according to claim 1, wherein the direction of the magnetic bias imparted to the first magnetization free layer by the pair of first antiferromagnetic films and the direction of the magnetic bias imparted to the second magnetization free layer by the pair of second antiferromagnetic films make an angle ranging from about 60° to 120° with each other.

3. The magnetoresistive head according to claim 1, wherein each of a distance between the pair of first antiferromagnetic films and a distance between the pair of second antiferromagnetic films is about 0.5 $\mu$m or less.

4. The magnetoresistive head according to claim 3, wherein each of the distance between the pair of first antiferromagnetic films and the distance between the pair of second antiferromagnetic films is about 0.2 $\mu$m or less.

5. A perpendicular magnetic recording-reproducing apparatus, comprising:
   a perpendicular magnetic recording medium; and
   a magnetoresistive head according to claim 1 arranged to face the perpendicular magnetic recording medium.

* * * * *